US012627257B1

(12) United States Patent
Coosaia, Jr. et al.

(10) Patent No.:     US 12,627,257 B1
(45) Date of Patent:        May 12, 2026

(54) THERMAL MANAGEMENT FOR BUILDING-INTEGRATED PHOTOVOLTAICS

(71) Applicant: Energy Facade Systems LLC, Chicago, IL (US)

(72) Inventors: Ed Coosaia, Jr., Livermore, CA (US); Akram Maradni, Chicago, IL (US); Jean-Christophe Giron, Edina, MN (US)

(73) Assignee: ENERGY FACADE SYSTEMS LLC, Chicago, IL (US)

( * ) Notice: Subject to any disclaimer, the term of this patent is extended or adjusted under 35 U.S.C. 154(b) by 0 days.

(21) Appl. No.: 19/353,320

(22) Filed:     Oct. 8, 2025

(51) Int. Cl.
| | |
|---|---|
| *H02S 40/42* | (2014.01) |
| *E04B 2/96* | (2006.01) |
| *H02S 20/26* | (2014.01) |

(52) U.S. Cl.
CPC ............ *H02S 40/425* (2014.12); *E04B 2/967* (2013.01); *H02S 20/26* (2014.12)

(58) Field of Classification Search
CPC ......... H02S 40/425; H02S 20/26; E04B 2/967
See application file for complete search history.

(56)          References Cited

U.S. PATENT DOCUMENTS

| | | | |
|---|---|---|---|
| 4,003,619 | A | 1/1977 | Smith |
| 5,381,637 | A | 1/1995 | Farag |
| 5,579,616 | A | 12/1996 | Farag |
| 7,987,644 | B2 | 8/2011 | Walker et al. |

| | | | | |
|---|---|---|---|---|
| 11,396,750 | B2 | 7/2022 | White et al. | |
| 11,732,474 | B1 | 8/2023 | Phelps et al. | |
| 11,879,249 | B1 | 1/2024 | Phelps et al. | |
| 12,000,146 | B2 * | 6/2024 | Smith ...................... E04B 2/92 |
| 2008/0163918 | A1 | 7/2008 | Li | |
| 2010/0027196 | A1 | 2/2010 | Schell et al. | |
(Continued)

FOREIGN PATENT DOCUMENTS

| | | |
|---|---|---|
| CN | 201059027 Y | 5/2008 |
| CN | 209104170 U | 7/2019 |
(Continued)

OTHER PUBLICATIONS

ENPHASE, IQ8 commercial microinverters data sheet, retrieved Oct. 21, 2025, URL: https://enphase.com/download/iq8-commercial-microinverters-data-sheet.

(Continued)

*Primary Examiner* — Patrick J Maestri
(74) *Attorney, Agent, or Firm* — PERKINS COIE LLP

(57)          ABSTRACT

A wall system for a building (such as an exterior façade for a building) may include a plurality of structural members, a plurality of vent openings in the structural members, and a photovoltaic panel attached to the structural members. The vent openings facilitate providing airflow from an exterior of the building to a thermal relief region between the photovoltaic panel and the building, to cool the photovoltaic panel for improved efficiency and lifespan of the photovoltaic panel. In some embodiments, the photovoltaic panel may be supported in a cassette for attachment to a frame of a wall system, and the vent openings may be in a frame of the cassette or the frame of the wall system. The vent openings may further be configured to pass moisture therethrough, to release moisture from within the wall system.

21 Claims, 2 Drawing Sheets

(56) References Cited

U.S. PATENT DOCUMENTS

| | | |
|---|---|---|
| 2010/0071282 A1 | 3/2010 | Tofflemire |
| 2010/0071748 A1 | 3/2010 | Brescia |
| 2017/0040929 A1 | 2/2017 | Ting |
| 2017/0040940 A1 | 2/2017 | Ting |
| 2017/0070185 A1 | 3/2017 | Ting |
| 2017/0298621 A1* | 10/2017 | Frederick ................ E04B 2/967 |
| 2019/0078380 A1 | 3/2019 | Mckenna et al. |
| 2019/0264491 A1 | 8/2019 | Mckenna |
| 2021/0324679 A1 | 10/2021 | Ruiter |
| 2022/0337188 A1 | 10/2022 | Saleem et al. |

FOREIGN PATENT DOCUMENTS

| | | | |
|---|---|---|---|
| CN | 111827533 A | 10/2020 | |
| DE | 202005000582 U1 | 5/2006 | |
| EP | 0475417 A2 | 3/1992 | |
| JP | 2014136919 A | 7/2014 | |
| KR | 20090030134 A | 3/2009 | |
| KR | 101063208 B1 | 9/2011 | |
| KR | 20200005766 A | 1/2020 | |
| TW | 1693334 B | 5/2020 | |
| WO | 2010039541 A1 | 4/2010 | |
| WO | 2011152311 A1 | 12/2011 | |
| WO | 2018152249 A1 | 8/2018 | |
| WO | WO-2024196418 A1 * | 9/2024 | ............ H02S 20/26 |

OTHER PUBLICATIONS

ENPHASE, IQ8P-3P Microinverter, retrieved Oct. 21, 2025, URL: https://enphase.com/store/microinverters/iq8-series/iq8p-3p-microinverter.

ENPHASE, QD cable and accessories data sheet, retrieved Oct. 21, 2025, URL: https://enphase.com/download/qd-cable-and-accessories-data-sheet.

ENPHASE, QD Dable portrait 1.7m, retrieved Oct. 21, 2025, URL: https://enphase.com/store/cables-and-connectors/qd-cable-portrait-17m.

ENPHASE, QD Sealing Cap female, retrieved Oct. 21, 2025, URL: https://enphase.com/store/cables-and-connectors/qd-sealing-cap-female.

Glanz, What are window trickle vents and why you (might) need them, Vistaza, URL:https://vistaza.com/window-trickle-vents/, retrieved Oct. 21, 2025.

Leader, Solar cable harness solar parallel circuit array harness, retrieved Oct. 21, 2025, URL: https://www.leader-solar.com/product/solar-cable-harness-solar-parallel-circuit-array-harness-5-strings-assemblies.html.

Solar Edge, Installation guide, retrieved Oct. 21, 2025, URL: https://cdn.shopify.com/s/files/1/0612/1924/2053/files/SolarEdge_Power_Optimizers_Installation_Guide_1.pdf.

Solar Edge, power optimizer specfication, retrieved Oct. 21, 2025, URL: SolarEdge_Power_Optimizer_Specs_a10f9116-f988-48f4-a10d-00205f275a7b.pdf.

Solux, SolarEdge power optimizer P505, retrieved Oct. 21, 2025, URL: https://solux.energy/products/p505-optimizer-for-solar-panels.

Tigo, Intro to Tigo TS4-A-O/S/M, retrieved Oct. 21, 2025, URL: https://support.tigoenergy.com/hc/en-us/articles/211807027-Intro-to-Tigo-TS4-A-O-S-M-Monitoring-Group.

Tigo, Quick start guide TS4-A-O/S/M, retrieved Oct. 21, 2025, URL: https://www.tigoenergy.com/documents/quick-start-guide-ts4-cca-tap.

Titon, Trimvent supervent, URL: https://products.titon.com/product/trimvent-supervent/, retrieved Oct. 21, 2025.

ISA/US, "International Search Report and Written Opinion", for Application No. PCT/US2024/014110, Aug. 2, 2024. (18 pages).

ISA/US, "Invitation to Pay Additional Fees/Partial Search", for Application No. PCT/US2024/014110, Jun. 3, 2024, 2 pages.

* cited by examiner

THERMAL MANAGEMENT FOR BUILDING-INTEGRATED PHOTOVOLTAICS

BACKGROUND

Many conventional buildings, such as high-rises or other buildings, include internal structures that support an externally facing outer wall, which is commonly called a façade. Conventional façades may include window wall systems, curtain wall systems, hybrid wall systems, or other wall systems. Conventional façade/wall systems include one or more frames made from a metal or vinyl material. The frames support a glass or opaque infill that is attached by a process commonly called "glazing."

Conventional façades or other wall systems may include a weather-tight enclosure that forms a barrier between the external environment and the building environment. In such systems, even if external elements (e.g., moisture) enter the system, the external elements may be blocked by a barrier within the system that prevents the elements from entering the building envelope. In such systems, the area where external elements may enter can be deemed a "wet" area, while the area within the building envelope that is protected by the barrier may be called a "dry" area.

Some buildings may include photovoltaic panels that convert sunlight to energy. Such systems may be called "building-integrated photovoltaic" systems ("BIPV" systems). One factor that impacts the efficiency and lifespan of photovoltaic panels is heat. The lifespan of a photovoltaic panel (e.g., the span of time in which it converts sunlight to energy at an acceptable rate) is substantially reduced when the panel is exposed to long periods of high heat, so thermal management is an important design consideration. Conventional BIPV systems and solar farms are installed in open environments where natural ventilation mitigates panel degradation.

SUMMARY

Representative embodiments of the present technology include a wall system for enclosing a portion of a building. The wall system may include a frame structure, one or more infills supported by the frame structure, and a system for providing airflow to the one or more infills. The frame structure may include a first horizontal frame element and one or more vertical frame elements connected to the first horizontal frame element. The one or more infills may be attached to the first horizontal frame element and spaced apart from the one or more vertical frame elements along a horizontal direction. The first horizontal frame element may include an interior region extending from a first side of the first horizontal frame element adjacent to the one or more infills, along a direction away from the one or more infills. The one or more infills may be attached to the first side of the first horizontal frame element. The first side of the first horizontal frame element may include a first vent opening extending between the interior region and a region outside of the wall system and the building, wherein the first vent opening is configured to allow flow of matter between the interior region and the region outside of the wall system. A second side of the first horizontal frame element adjacent to the first side may include a second vent opening positioned between the one or more infills and the one or more vertical frame elements along the horizontal direction. The second vent opening may be configured to allow matter to flow within the system envelope that is exposed to exterior elements (e.g., the "wet" area), which may include the interior region within the first horizontal frame element and a first thermal relief region located between the one or more infills and the one or more vertical frame elements.

Another representative wall system for enclosing a portion of a building may include one or more horizontal frame elements configured to be attached to a side of the building, one or more cassettes configured to be supported by the one or more horizontal frame elements, and one or more adapter structures configured to connect the one or more cassettes to the one or more horizontal frame elements. When the one or more cassettes are connected to, and supported by, the one or more horizontal frame elements, the wall system may form a thermal relief region positioned between an infill of the one or more cassettes and an adjacent portion of the building. The system may have a plurality of vents for receiving or expelling airflow in or out of the thermal relief region.

Representative embodiments of the present technology may further include methods of providing airflow to a BIPV, and optionally, removing moisture weeping from behind the BIPV. For example, a method may include forming openings in structural members, attaching a BIPV to the structural members, and forming an exterior vent to pass airflow between an external region adjacent to a front side of the BIPV and a thermal relief region adjacent to the backside of the BIPV, e.g., via vent openings in the structural members.

Other features, embodiments, and advantages will appear hereinafter. The features described herein can be used separately or together, or in various combinations of one or more of them.

BRIEF DESCRIPTION OF THE DRAWINGS

In the drawings, wherein the same reference number indicates the same element throughout the several views.

DETAILED DESCRIPTION

Figure 1:
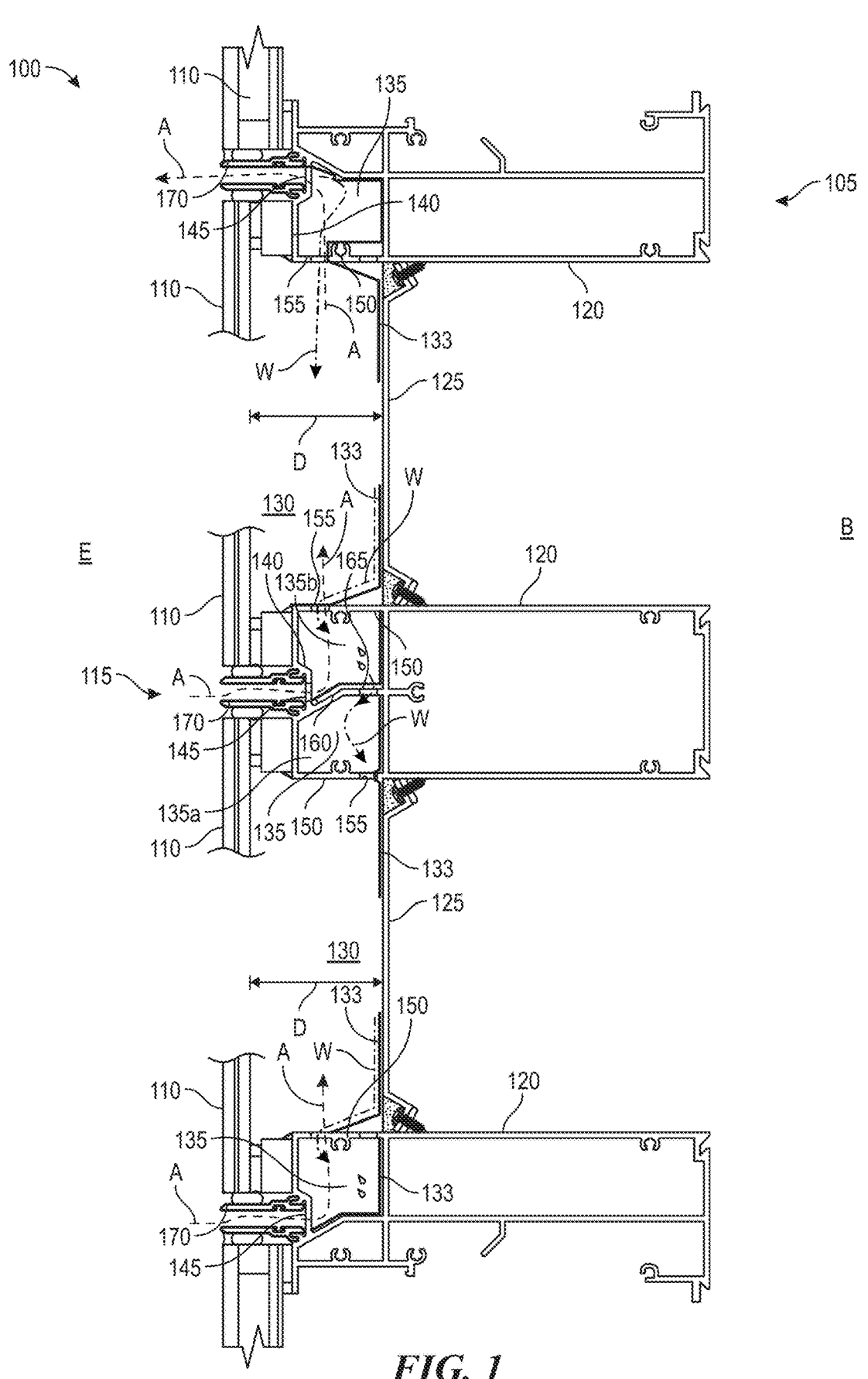
FIG. 1 illustrates a schematic side cross-sectional view of a wall system configured in accordance with embodiments of the present technology, for enclosing a portion of a building.

The present technology is directed to thermal management of building-integrated photovoltaics, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions—such as structures or functions associated with photovoltaic panels or other electronic panel structures (e.g., displays), or general building structures—may not be shown or described in detail to avoid unnecessarily obscuring the relevant description of the various embodiments. Accordingly, embodiments of the present technology may include additional elements or exclude some of the elements described below with reference to FIGS. 1 and 2, which illustrate examples of the technology.

The terminology used in this description is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all the items in the list, or (c) any combination of items in the list. Further, unless otherwise specified, terms such as "attached" or "connected" are intended to include integral connections, as well as connections between physically separate components.

Numerical adjectives such as "first" and "second," as used in the present disclosure, do not convey hierarchy or specific features or functions. Rather, such numerical adjectives are intended to aid the reader in distinguishing between elements which may have similar nomenclature, but which may differ in position, orientation, or structure. Accordingly, such numerical adjectives may be used differently in the claims. The components in the drawings are not necessarily drawn to scale.

Embodiments of the present technology include, but are not limited to, façade/wall systems (hereinafter referred to as "wall systems" for convenience only) that may be anchored to a primary structure, such as a building floor or slab, or to a secondary structure (e.g., a metal or wood frame or another suitable portion or structure associated with a building). The wall systems include infills with photovoltaic panels or similar electronic panels (e.g., displays) and suitable electricity or data distribution capabilities. For convenience, such panels and systems may be referred to herein simply as photovoltaic panels, but it is understood that embodiments of the present technology can implement other panels.

In some embodiments, BIPV systems and other infills may trap heat within the "wet" area, especially in warm, hot, or sunny conditions. Embodiments of the present technology manage such heat to maintain or improve efficiency and longevity of the photovoltaic panels, or to reduce degradation and improve the working lifespan of the panels.

FIG. 1 illustrates a schematic side cross-sectional view of a wall system 100 configured in accordance with embodiments of the present technology, for enclosing a portion of a building B. For context, the environment E outside of the building B is at the left side of FIG. 1. The wall system 100 illustrated in FIG. 1 may be mounted or attached to the building B by any suitable methods. For example, the wall system 100 may form a façade for the building B. In some embodiments, aspects or components of the wall system 100 may include one or more structures or components described or illustrated in U.S. Pat. No. 12,421,718 or U.S. patent application Ser. No. 19/305,557, the disclosures of which are incorporated herein by reference. In general, the wall system 100 may be configured to enclose at least part of the building B (e.g., a "dry" area).

In some embodiments, the wall system 100 may include a frame structure 105, one or more infills 110 supported by the frame structure 105, and a system 115 for providing airflow to the one or more infills 110. The frame structure 105 may include one or more horizontal frame elements 120 and one or more vertical frame elements 125 connected to the one or more horizontal frame elements 120. The one or more infills 110 may be connected to the one or more horizontal frame elements 120. The one or more infills 110 may be spaced apart from the one or more vertical frame elements 125 or other vertical building structure along a horizontal direction D, forming one or more thermal relief regions 130 generally bounded by the one or more infills 110, the one or more horizontal frame elements 120, and the one or more vertical frame elements 125 (or other vertical building structure). The infills 110 are only partially illustrated in the figures. The viewer will recognize that the infills 110 extend to generally enclose the thermal relief regions 130. The thermal relief regions 130 form part of the "wet" area partially exposed to the external environment E, as opposed to the "dry" area within the envelope of the building B. In some embodiments, a barrier 133 may separate the "wet" area from the "dry" area. In the figures, the barrier 133 may only be partially shown, but it is understood to be a layer or structure of material that limits, controls, or prevents external environmental elements from the "wet" area from entering the "dry" area, and it is operably positioned between the wall system 100 and the "dry" area.

In some embodiments, at least one of the one or more horizontal frame elements 120 includes an interior region 135 extending from a first side 140 of the horizontal frame element 120 adjacent to the one or more infills 110, along a direction away from the one or more infills 110 (e.g., along horizontal direction D). The first side 140 may include a first vent opening 145 extending between the interior region 135 and a region outside of the wall system and the building (e.g., the environment E). The first vent opening 145 may be configured to allow flow of matter (e.g., air A) between the interior region 135 and the region E outside of the wall system 100. Accordingly, the interior region 135 may be part of the "wet" area.

In some embodiments, the horizontal frame element 120 may include a second side 150 adjacent (e.g., perpendicular or transverse to) the first side 140. The second side 150 may include a second vent opening 155 located between the one or more infills 110 and the one or more vertical frame elements 125 (or other building structure towards area B) along the horizontal direction. The second vent opening 155 may be configured to allow flow of matter (e.g., air A or water W) between the interior region 135 and one of the thermal relief regions 130.

The first vent opening 145 and the second vent opening 155 provide new and advantageous functions. For example, as generally indicated by the arrows A and W in FIG. 1, air A may flow in or out of the first vent openings 145, through the interior region 135, and through the second vent opening 155 (i.e., in or out of the "wet" area relative to the external environment E). The airflow A may bring cooler air from the external environment E into the thermal relief regions 130 (e.g., behind the infills 110) to cool the infills 110. In some embodiments, the airflow A may enter one first vent opening 145, pass through the interior region 135, and then out of another first vent opening 145. Because heat rises, hot air behind the infills 110 in the thermal relief regions may tend to exit a higher first vent opening 145, which in turn draws cooler air into a lower first vent opening 145. In some embodiments, the infills 110 are environmentally sealed around their perimeter (i.e., the thermal relief regions 130 may be environmentally sealed relative to the external environment E), except for airflow through the first vent opening(s) 145. If condensation or "weeping" occurs, or if moisture enters the "wet" area from the external environment E, such water W can be directed to fall downward through the wall system 100 (e.g., to an exit point at a lower level) via the second vent opening(s) 155 (as generally shown in FIG. 1 with the indicator "W."

The airflow A may cool the infills 110 to maintain their longevity or efficiency. In some embodiments, the infills 110 may include photovoltaic panels, so the airflow A may cool the photovoltaic panels while the overall wall system 100 generally seals the building B against the environment E (e.g., with the barrier 133). Embodiments of the present technology can therefore improve longevity or efficiency of the infills 110 while also improving overall building efficiency (e.g., climate control efficiency).

In some embodiments, one or more of the horizontal frame elements 120 may further include an interior structural element 160 extending through at least part of the interior region 135, which may divide the interior region 135 into two interior subregions 135a, 135b. In some embodiments, the interior structural element 160 may include a third vent opening 165 for allowing matter flow (e.g., air A or water W) between the two interior subregions.

In some embodiments, the system 115 may include additional vent openings 155 on each of the top and bottom sides of the horizontal frame elements 120 (e.g., the second sides 150), which can facilitate airflow A or weeping W through multiple levels (e.g., horizontal frame elements 120) and multiple thermal relief regions 130. In general, airflow A may pass between the external environment E and the "wet" area, which includes the interior region(s) 135 of the horizontal frame element(s) 120 and the thermal relief regions 130, and moisture may be managed or removed by allowing it to fall through the thermal relief regions 130, through the horizontal frame elements 120, down to an exit area (not shown) where the moisture exits the "wet" area.

In some embodiments, as generally illustrated in FIG. 1, one or more of the first vent opening(s) 145 may be positioned between two infills 110 (e.g., in a vertical gap between the two infills 110). In some embodiments, the one or more infills 110 are attached to the first side 140 of a corresponding horizontal frame element, for example, via a panel adapter structure 170. One or more of the first vent opening(s) 145 may extend through the panel adapter structure 170. In some embodiments, the panel adapter structure 170 or the first vent opening(s) 145 may include one or more seals for resisting passage of moisture while facilitating airflow through the first vent opening(s).

Figure 2:
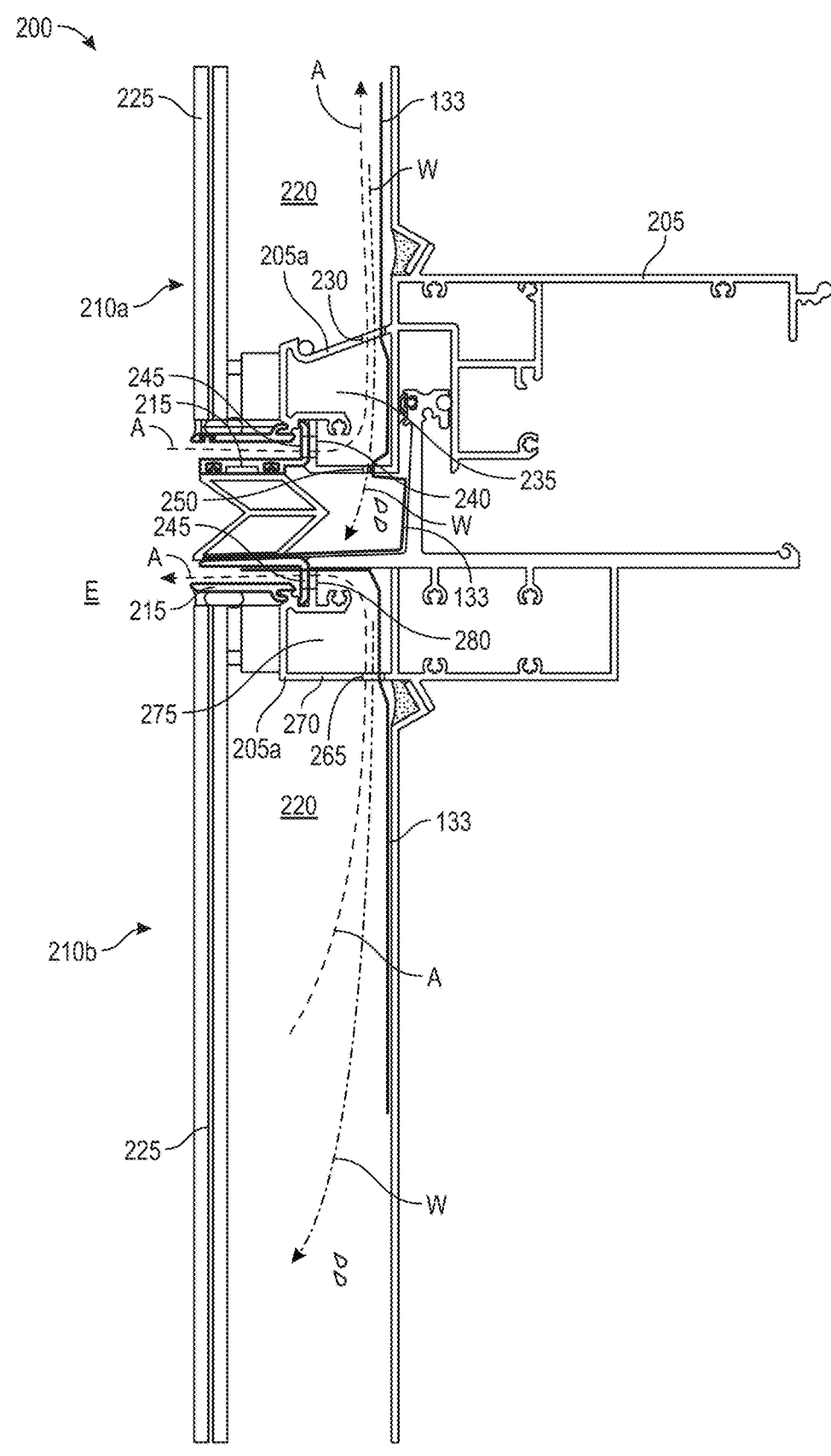
FIG. 2 illustrates a schematic side cross-sectional view of a wall system configured in accordance with further embodiments of the present technology, for enclosing a portion of a building.

FIG. 2 illustrates a schematic side cross-sectional view of a wall system 200 configured in accordance with further embodiments of the present technology, for enclosing a portion of a building B. In some embodiments, the wall system 200 may have generally similar features to the wall system 100 described above in connection with FIG. 1. For example, the wall system 200 may include one or more horizontal frame elements 205, one or more cassettes 210, or one or more adapter structures 215. In contrast with the wall system 100 described above in connection with FIG. 1, in which the frame structure 105 may directly support the infill(s) 110, each cassette 210 in the wall system 200 may be a modular structure having its own framing or support structure and infill 225, such that the cassette 210 may be installed in or removed from the horizontal frame elements 205 (or vertical frame elements) as a unit.

The one or more horizontal frame elements 205 may be configured to be attached to a side of the building B (e.g., directly to the building B or to one or more vertical frame elements described above). The one or more cassettes 210 may be configured to be supported by the one or more horizontal frame elements 205. The one or more adapter structures 215 may be configured to connect the one or more cassettes 210 to the one or more horizontal frame elements 205. When the one or more cassettes 210 are connected to, and supported by, the one or more horizontal frame elements 205, the wall system 200 forms a thermal relief region 220 positioned between the infill 225 of the one or more cassettes 210 and an adjacent portion of the building B. The thermal relief region(s) 220 form part of the "wet" area partially exposed to the external environment E, as opposed to the "dry" area within the envelope of the building B. In some embodiments, a barrier 133 may separate the "wet" area from the "dry" area. In the figures, the barrier 133 may only be partially shown, but it is understood to be a layer or structure of material that limits, controls, or prevents external environmental elements from the "wet" area from entering the "dry" area, and it is operably positioned between the wall system 200 and the "dry" area (e.g., the envelope of building B).

Each cassette 210 may include one or more of its own horizontal frame elements 205a, which may engage the horizontal frame elements 205 attached to the building B. For at least one horizontal frame element 205a of the one or more horizontal frame elements 205a, the at least one horizontal frame element 205a may include one or more first vent openings 230 positioned and configured to allow flow of matter between (a) an interior region 235 of the least one horizontal frame element 205a along with the thermal relief region 220, and (b) one or more second vent openings 240 connected to the interior region 235. In some embodiments, the one or more adapter structures 215 include one or more third vent openings 245 positioned and configured to allow flow of matter between the external region E outside the wall system (and outside the building B), and the interior region 235, via the one or more second vent openings 240.

In some embodiments, like the wall system 100 described above with regard to FIG. 1, the wall system 200 generally illustrated in FIG. 2 facilitates cooling the thermal relief region 220 via airflow A. For example, the wall system 200 receives or expels airflow A through the one or more third vent openings 245, via the one or more second vent openings 240, the interior region 235, the one or more first vent openings 230, and the thermal relief region 220.

In some embodiments, the at least one horizontal frame element 205a of the one or more horizontal frame elements 205a comprises a fourth vent opening 250 positioned on a bottom side of the horizontal frame element 205a (e.g., below at least one of the one or more first vent openings 230). The fourth vent opening 250 may be positioned and configured to facilitate receiving moisture ("weep") W from the one or more first vent openings 230 via the interior region 235, and to release the moisture W from the at least one horizontal frame element 205a to the external region E.

In some embodiments, the wall system comprises a plurality of cassettes 210, such that an upper cassette 210a of the plurality of cassettes 210 is positioned above the one or more adapter structures 215. A lower cassette 210b of the plurality of cassettes 210 may be positioned below the one or more adapter structures 215. In some embodiments, an infill 225 of the one or more cassettes 210 includes a photovoltaic panel. In operation, the airflow A cools the photovoltaic panel (e.g., in a manner similar to the manner described above with regard to FIG. 1), and the moisture flow ("weep") W removes potential condensation.

In some embodiments, the frame or horizontal frame element 205a of the cassette 210b may further include one or more additional vent openings for air venting or moisture removal. For example, a cassette 210b may include a sixth vent opening 265 in a lower structural component 270 of the horizontal frame element 205a in the cassette 210b. A similar opening (not visible) may be in the cassette 210a.

Airflow A may pass upwards through the sixth vent opening 265, through a space or interior region 275 within the horizontal frame element 205*a* or otherwise through part of the cassette 210*b*, and out of the one or more adapter structures 215 (e.g., via a seventh vent opening 280 connected to a third vent opening 245 in the one or more adapter structures 215.

In some embodiments, the cassettes 210 may be self-contained or self-supported modules that may be installed or removed from the remaining components of the wall system(s) disclosed herein. Such modularity facilitates simplified installation and maintenance. Some embodiments may have passive cooling and ventilation relying on movement of airflow due to heat rising, as described above. However, other embodiments may further include active systems such as fans to propel the airflow within the systems. Some embodiments may include phase-change materials (e.g., coolants).

Embodiments of the present technology further include methods of providing airflow to a building-integrated photovoltaic panel or other infill. For example, a method may include forming a horizontal frame element, forming a plurality of openings in the horizontal frame element (e.g., the vent openings described above in connection with FIG. 1 or 2), attaching the horizontal frame element to a building, or attaching a photovoltaic panel (see, e.g., the infills 110, 225 described above) to a first side of the horizontal frame element (e.g., the first side 140 described above). The photovoltaic panel may include an exterior side configured to face away from a building and a backside facing an opposite direction from the exterior side (e.g., facing the thermal relief region 130). Attaching the photovoltaic panel to the first side of the horizontal frame element may include positioning the plurality of openings in the horizontal frame element between the backside of the photovoltaic panel and an interior of the building (e.g., in a manner such that the plurality of openings in the horizontal frame element may open to the thermal relief region). The method may further include forming one or more exterior airflow vents (e.g., through the panel adapter structure 170 via the first vent opening 145 described above). The exterior airflow vents may open to the external region E and the exterior side of the photovoltaic panel may face the external region E, as well as the interior region of the horizontal frame element (e.g., the interior region 135). The exterior airflow vents may pass airflow A between the external region E and the thermal relief region 130.

In some embodiments, the method may further include forming one or more vertical frame elements, attaching the one or more vertical frame elements to the building, and attaching the horizontal frame element to the one or more vertical frame elements. Forming the horizontal frame element may include forming the interior structural element 160, which may include forming the additional opening 165 in the interior structural element 160. In some embodiments, the method may include forming a cassette 210. The cassette 210 may include the horizontal frame element and the photovoltaic panel.

Embodiments of the present technology may include kits of parts comprising any quantity or combination of any of the components disclosed herein. For example, in some embodiments, a kit of parts may include components of a frame system (e.g., horizontal or vertical frame elements), one or more cassettes, one or more infills (e.g., photovoltaic panels and associated hardware and wiring), one or more cassettes (e.g., with photovoltaic panels as infills), or other components or combinations of components.

Aspects of embodiments of the present technology provide several advantages. For example, the wall systems may keep wet exterior elements outside of a building, ensuring that the interior environment is only exposed to the dry elements of the wall system (e.g., electronics associated with the photovoltaic panels), while mitigating thermal degradation concerns and preventing or limiting moisture-related issues often associated with traditional systems. The present technology facilitates both weather-sealing of the building and thermal venting of BIPV without compromising the overall integrity of the façade structure (e.g., the supporting framework, etc.). Several embodiments of the present technology do not require operation (manual or automatic) of a window vent to control heat and block moisture. Some embodiments of the present technology may be deemed passive systems that use thermodynamics and airflow to dissipate heat via the airflow through the vents. Generally, aspects of embodiments of the present technology can improve energy output and lifespan of BIPV systems.

The accompanying figures depict embodiments of the present technology and are not intended to be limiting of its scope. The sizes of various depicted elements are not necessarily drawn to scale, and these various elements may be arbitrarily enlarged in the figures to improve legibility. Component details may be abstracted in the figures to exclude details such as positions of components, and certain precise connections between such components, when such details are unnecessary for a complete understanding of how to make and use the present technology. Many of the details, dimensions, angles and/or other features shown in the figures are merely illustrative of particular embodiments of the present technology. Accordingly, other embodiments can have other details, dimensions, angles, and/or features without departing from the spirit or scope of the present disclosure.

From the foregoing, it will be appreciated that specific embodiments of the presently disclosed technology have been described herein for purposes of illustration, but that various modifications may be made without deviating from the scope of the technology. For example, frame structures for wall systems according to embodiments of the present technology can have other forms or other components. In general, the present technology relates to vents for airflow or weeping in otherwise closed systems, so embodiments of the present technology include vent openings in structural components of a wall or façade to provide airflow to a backside of a BIPV. In some embodiments, vertical components may be oriented horizontally, or horizontal components may be oriented vertically. In some embodiments, components of the wall systems disclosed herein may be repeated or duplicated and interconnected to form cladding or a façade for large portions or all of a building. For example, a large building may be substantially covered with photovoltaic panels for producing energy.

Certain aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

To the extent any materials incorporated herein by reference conflict with the present disclosure, the present disclosure controls.

What is claimed is:

1. A wall system for enclosing a portion of a building, the wall system comprising a frame structure, one or more infills supported by the frame structure, and a system for providing airflow to the one or more infills, wherein:

the frame structure comprises a first horizontal frame element and one or more vertical frame elements connected to the first horizontal frame element;

the one or more infills are attached to the first horizontal frame element and spaced apart from the one or more vertical frame elements along a horizontal direction;

the first horizontal frame element comprises an interior region extending from a first side of the first horizontal frame element adjacent to the one or more infills, along a direction away from the one or more infills;

the one or more infills are attached to the first side of the first horizontal frame element;

the first side of the first horizontal frame element comprises a first vent opening extending between the interior region and a region outside of the wall system and the building, wherein the first vent opening is configured to allow flow of matter between the interior region and the region outside of the wall system; and a second side of the first horizontal frame element adjacent to the first side comprises a second vent opening positioned between the one or more infills and the one or more vertical frame elements along the horizontal direction, wherein the second vent opening is configured to allow flow of matter between the interior region and a first thermal relief region between the one or more infills and the one or more vertical frame elements.

2. The wall system of claim 1, wherein the first horizontal frame element comprises an interior structural element extending through the interior region.

3. The wall system of claim 2, wherein the interior structural element comprises a third vent opening positioned to allow flow of matter between a first subregion of the interior region and a second subregion of the interior region.

4. The wall system of claim 1, wherein a third side of the first horizontal frame element adjacent to the first side and opposite the second side comprises a third vent opening positioned between the one or more infills and the one or more vertical frame elements, wherein the third vent opening is configured to allow flow of matter between the interior region and a second thermal relief region, wherein the first horizontal frame element is positioned between the first thermal relief region and the second thermal relief region.

5. The wall system of claim 4, further comprising a second horizontal frame element positioned above or below the first horizontal frame element, wherein:

the second horizontal frame element is attached to at least one of the one or more vertical frame elements;

the one or more infills are attached to a first side of the second horizontal frame element and spaced apart from the one or more vertical frame elements along the horizontal direction;

the first side of the second horizontal frame element comprises a fourth vent opening;

a second side of the second horizontal frame element comprises a fifth vent opening; and the fourth vent opening and the fifth vent opening are configured to facilitate flow of matter between the second thermal relief region and the region outside the wall system.

6. The wall system of claim 1, wherein each infill of the one or more infills comprises a photovoltaic panel.

7. The wall system of claim 6, wherein the one or more infills comprises two infills spaced apart from each other along a vertical direction.

8. The wall system of claim 7, wherein at least part of the first vent opening is positioned between the two infills, along the vertical direction.

9. The wall system of claim 1, wherein the first vent opening and the second vent opening are configured to facilitate airflow between and among: (a) the region outside the wall system; (b) the interior region of the first horizontal frame element; and (c) the first thermal relief region.

10. The wall system of claim 8, further comprising a second horizontal frame element positioned above or below the first horizontal frame element, wherein:

the second horizontal frame element is attached to at least one of the one or more vertical frame elements;

the one or more infills are attached to a first side of the second horizontal frame element and spaced apart from the one or more vertical frame elements along the horizontal direction;

the first side of the second horizontal frame element comprises a third vent opening;

a second side of the second horizontal frame element comprises a fourth vent opening; and the third vent opening and the fourth vent opening are configured to facilitate flow of matter between the first thermal relief region and the region outside the wall system.

11. The wall system of claim 1, wherein the first vent opening comprises a seal for resisting passage of moisture while facilitating airflow therethrough.

12. The wall system of claim 1, wherein:

the second vent opening is positioned to receive condensation from the first thermal relief region, into the interior region of the first horizontal frame element; and the first horizontal frame element further comprises a third vent opening into a second thermal relief region, wherein the first horizontal frame element is positioned between the first thermal relief region and the second thermal relief region.

13. The wall system of claim 1, further comprising a panel adapter structure, wherein the panel adapter structure connects the one or more infills to the first horizontal frame element, and wherein the panel adapter structure comprises the first vent opening, wherein the first vent opening extends through at least part of the panel adapter structure.

14. A wall system for enclosing a portion of a building, the wall system comprising:

a cassette configured to be attached to a side of a building, wherein the cassette comprises a frame structure; and one or more adapter structures configured to connect the cassette to the building, wherein when the cassette is connected to, and supported by, the building, the wall system forms a thermal relief region positioned between an infill carried by the cassette and an adjacent portion of the building;

wherein:

the frame structure of the cassette comprises (a) one or more first vent openings positioned and configured to allow flow of matter between an interior region of the frame structure of the cassette and the thermal relief region, and (b) one or more second vent openings connected to the interior region;

the one or more adapter structures comprise one or more third vent openings positioned and configured to allow flow of matter between (a) an external region outside the wall system and the building, and (b) the interior region of the frame structure of the cassette, via the one or more second vent openings; and the wall system facilitates receiving or expelling airflow through the one or more third vent openings, via the one or more second vent openings, the interior region, the one or more first vent openings, and the thermal relief region.

15. The wall system of claim 14, wherein the frame structure of the cassette comprises a fourth vent opening positioned below at least one of the one or more first vent openings, wherein the fourth vent opening is positioned and configured to facilitate receiving moisture from the one or more first vent openings via the interior region, and to release the moisture from the wall system to the external region.

16. The wall system of claim 14, further comprising the infill, wherein the infill comprises a photovoltaic panel.

17. The wall system of claim 14, wherein the wall system comprises a plurality of cassettes, wherein an upper cassette of the plurality of cassettes is positioned above the one or more adapter structures, and a lower cassette of the plurality of cassettes is positioned below the one or more adapter structures.

18. A method of providing airflow to a building-integrated photovoltaic panel, the method comprising:

forming a horizontal frame element;

forming a plurality of openings in the horizontal frame element;

attaching the horizontal frame element to a building;

attaching a photovoltaic panel to a first side of the horizontal frame element, wherein the photovoltaic panel has an exterior side configured to face away from a building and a backside facing an opposite direction from the exterior side, and wherein attaching the photovoltaic panel to the first side of the horizontal frame element comprises positioning the plurality of openings in the horizontal frame element between the backside of the photovoltaic panel and an interior of the building;

forming one or more exterior airflow vents, wherein the one or more exterior airflow vents open to (a) an external region, wherein the exterior side of the photovoltaic panel faces the external region and (b) an interior region of the horizontal frame element within the horizontal frame element, via at least one opening in the horizontal frame element of the plurality of openings in the horizontal frame element; and positioning the one or more exterior airflow vents to pass airflow between the external region and a thermal relief region adjacent to the backside of the photovoltaic panel via the plurality of openings in the horizontal frame element.

19. The method of claim 18, comprising forming a cassette, wherein the cassette comprises the horizontal frame element and the photovoltaic panel.

20. The method of claim 18, further comprising forming one or more vertical frame elements, attaching the one or more vertical frame elements to the building, and attaching the horizontal frame element to the one or more vertical frame elements.

21. The method of claim 18, wherein forming the horizontal frame element further comprises:

forming an interior structural element within the interior region of the horizontal frame element; and forming an additional opening in the interior structural element, wherein the additional opening is positioned and configured to pass moisture through at least part of the horizontal frame element.

* * * * *